Sept. 30, 1958

B. G. BJALME 2,854,216

COMBINED PIPE HOLDER AND WRENCH

Filed June 28, 1955

INVENTOR.
Bengt G Bjalme
BY
Ralph Hammar
Attorney

2,854,216
COMBINED PIPE HOLDER AND WRENCH

Bengt G. Bjalme, Erie, Pa., assignor to Reed Manufacturing Company, Erie, Pa., a corporation of Pennsylvania Application June 28, 1955, Serial No. 518,452

1 Claim. (Cl. 255—35)

In the installation or removal of drop pipe for deep wells, it is necessary to hold the string of depending pipe so it will not fall into the well. It is also necessary to prevent turning of the string as a length of pipe is screwed on or unscrewed from the upper end of the string. This invention is intended to combine those functions into a single tool.

In a preferred form, the tool has a frame encircling the string of pipe and made in two sections hinged together at one end and latched together at the other end. One of the frame members is rigid or solid and has at its outer part a flat bottom surface resting on substantially one-half the circumference of the upper end of a well casing. The inner part of the solid frame member has a recess encircling substantially one-half the circumference of the drop pipe. The other frame member is a yoke spaced above the solid frame member so as to be out of contact with the well casing. The solid frame member has a wrench handle and has pipe engaging jaws with teeth extending crosswise of the length of the pipe. The yoke has a crosshead carrying jaws with teeth extending lengthwise of the pipe. The crosswise jaw teeth keep the pipe from falling into the well while the lengthwise jaw teeth keep the pipe from turning as a section of pipe is screwed onto or unscrewed from the upper end of the string. Accordingly, the tool serves both as a pipe holder and as a pipe wrench.

Figure 1:
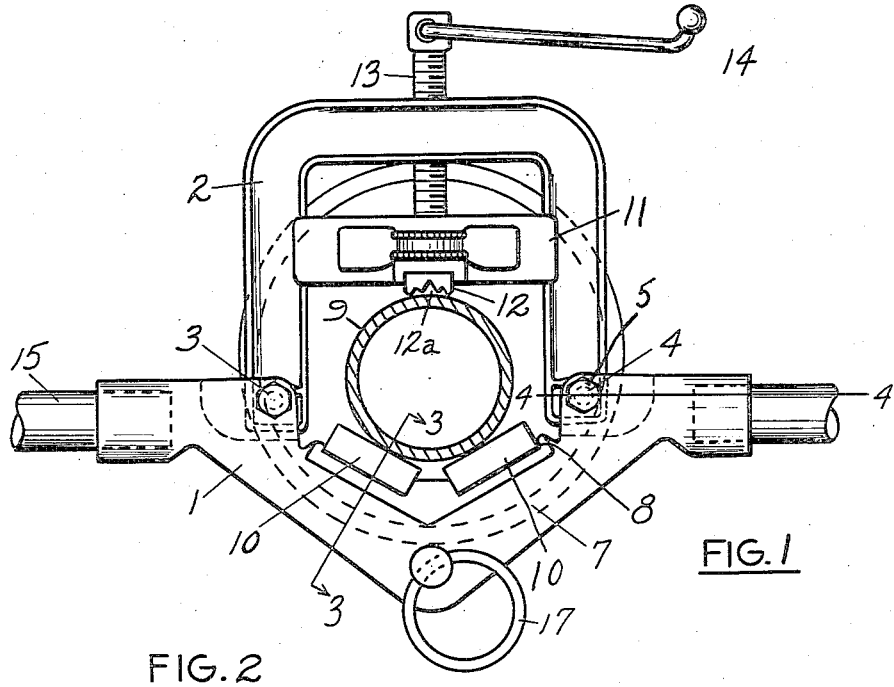
Figure 2:
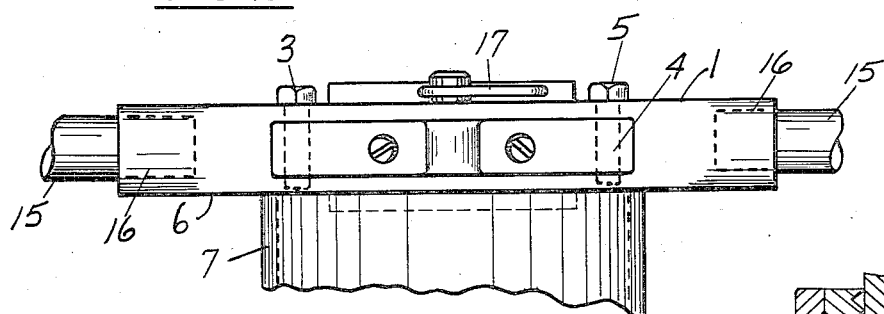
Figure 4:
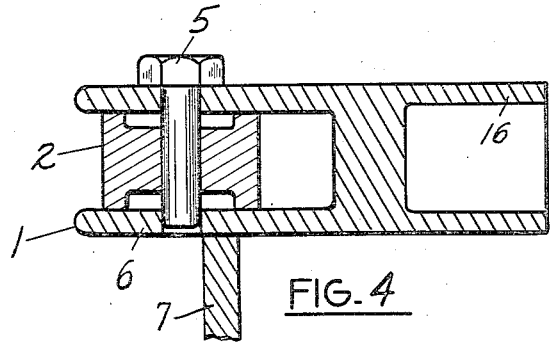
Figure 3:
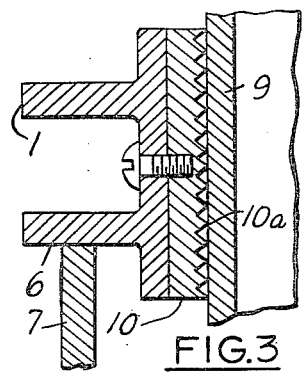

In the drawing, Fig. 1 is a plan view of the pipe holder; Fig. 2 is an edge view; Fig. 3 is a section on line 3—3 of Fig. 1 and Fig. 4 is a section on line 4—4 of Fig. 1.

In the drawing 1 indicates the rigid frame member and 2 indicates a yoke hinged at 3 to one side of the rigid frame member and releasably fastened at 4 to the other side of the rigid frame member, for example, by a removable pin 5. In use, the frame 1 and yoke 2 are at right angles to the axis of the pipe and the frame member 1 has a flat lower surface 6 below the yoke 2 as shown in Fig 4 and lying in a horizontal plane. The surface 6 rests on the upper end of a well casing 7 and takes the gravity load of the pipe string. As is apparent from Fig. 1, the flat surface 6 rests on substantially one-half the circumference of the upper end of the well casing so a stable support is provided. The yoke 2 as shown in Fig. 4 has its lower surface substantially above the flat surface 6 so that it is normally spaced above and out of contact with the well casing and is not subject to any of the gravity load of the pipe string.

The inner surface of the solid frame member 1 is generally C-shaped providing a recess 8 which encircles substantially one-half of the circumference of a drop pipe 9. Pipe jaws 10 which, as shown in Figs. 1 and 3 are fastened to the frame 1 within the recess 8, have teeth 10a extending crosswise to the length of the pipe. The yoke 2 has a crosshead 11 carrying a pipe jaw 12 having teeth 12a extending lengthwise of the pipe. The jaws are tightened against the pipe by a pressure screw 13 having a handle 14 by which it may be easily turned. When the jaws are tightened against the pipe, the jaws 10 by reason of the crosswise teeth 10a are primarily effective in sustaining the dead weight of the drop pipe. It will be noted that this dead weight is transmitted directly to the solid frame member 1 which rests flat on the upper end of the casing 7 so that none of this dead weight is transmitted to the hinged yoke number 2. The lengthwise extending teeth on the jaw 12 are not effective to sustain the dead weight of the pipe. When a new section of pipe is being threaded or unthreaded through the upper end of the drop pipe, it is necessary that the drop pipe be held against turning. This can be easily done by wrench handles 15 in sockets 16 on the solid frame member 1. The handles 15 can also be used for lifting the pipe or the pipe may be lifted by a ring 17 on the solid frame member 1.

What is claimed as new is:

A combined pipe holder and wrench for deep well drop pipe comprising a solid frame having a generally C-shaped section with a flat bottom surface resting on substantially one-half the circumference of the upper end of a well casing, said C-shaped section providing a recess encircling substantially one-half the circumference of a depending string of pipe, a yoke encircling the remainder of the circumference of the pipe hinged at one end and releasably locked at the other end to the solid frame member, said yoke having its bottom surface spaced above the flat bottom surface on the solid frame member whereby the yoke is out of contact with the well casing, jaws rigidly fixed on the solid frame member having teeth extending crosswise to the length of the pipe for engaging one side of the pipe to prevent lengthwise slipping of the pipe, a crosshead on the yoke, a jaw on the crosshead having teeth extending lengthwise of the pipe for engaging the opposite side of the pipe to prevent turning of the pipe, a pressure screw on the yoke for forcing the crosshead toward the pipe to grip the pipe between the jaws, and a wrench handle on the solid frame member for holding the pipe against turning, while another section of pipe is screwed onto or unscrewed from the upper end of the string.

References Cited in the file of this patent

UNITED STATES PATENTS

| | | |
|---|---|---|
| 595,309 | Johnson | Dec. 14, 1897 |
| 2,005,162 | Petersen | June 18, 1935 |
| 2,394,709 | Matter | Feb. 12, 1946 |